(12) United States Patent
Setzer

(10) Patent No.: US 12,458,962 B2
(45) Date of Patent: Nov. 4, 2025

(54) PIPETTING DEVICE

(71) Applicant: BRAND GMBH + CO KG, Wertheim (DE)

(72) Inventor: Daniel Setzer, Wertheim (DE)

(73) Assignee: BRAND GMBH + CO KG, Wertheim (DE)

( * ) Notice: Subject to any disclaimer, the term of this patent is extended or adjusted under 35 U.S.C. 154(b) by 509 days.

(21) Appl. No.: 18/119,325

(22) Filed: Mar. 9, 2023

(65) Prior Publication Data

US 2023/0321646 A1    Oct. 12, 2023

(30) Foreign Application Priority Data

Mar. 11, 2022    (DE) ..................... 10 2022 105 754.2

(51) Int. Cl.
*B01L 3/02* (2006.01)

(52) U.S. Cl.
CPC ........... *B01L 3/0227* (2013.01); *B01L 3/0279* (2013.01); *B01L 3/0217* (2013.01); *B01L 3/0231* (2013.01)

(58) Field of Classification Search
CPC .... B01L 3/0227; B01L 3/0279; B01L 3/0217; B01L 3/0231; F16H 2025/2075; F16H 2025/2087
See application file for complete search history.

(56) References Cited

U.S. PATENT DOCUMENTS

| | | | |
|---|---|---|---|
| 3,115,791 A | 12/1963 | Dean | |
| 4,399,712 A | 8/1983 | Oshikubo et al. | |
| 8,354,079 B2 | 1/2013 | Naumann | |
| 8,601,889 B2 | 12/2013 | Lessing | |
| 11,280,389 B2 | 3/2022 | Reichmuth et al. | |
| 2011/0132110 A1* | 6/2011 | Kimura | B01L 3/0224 73/864.01 |
| 2020/0072329 A1* | 3/2020 | Reichmuth | G01B 3/18 |
| 2020/0254440 A1 | 8/2020 | Hintikka | |

* cited by examiner

*Primary Examiner* — Benjamin R Whatley

(74) *Attorney, Agent, or Firm* — Calderon Safran & Wright P.C.; David S. Safran

(57) ABSTRACT

The invention relates to a pipetting device for receiving and dispensing fluid volumes. The pipetting device has a drive device with an electric motor and a gear device with a first output device. The gear device is driven by the electric motor by means of a rotary motion and is designed to transmit a rotary motion of the electric motor to the first output device. According to the invention, the gear device has a second output device and is designed to transmit a rotary motion of the electric motor to the second output device.

18 Claims, 12 Drawing Sheets

PIPETTING DEVICE

BACKGROUND OF THE INVENTION

Field of the Invention

The invention relates to a pipetting device for receiving and dispensing fluid volumes having a drive device with an electric motor, and a gear device having a first output device and a second output device.

Description of the Related Art

A pipetting device of the type in question is used for receiving and dispensing fluid volumes by means of a displacement device. Such a pipetting device is used in particular for the repeated dispensing, titration and/or pipetting of liquids.

The displacement device can be an integral part of the pipetting device or be designed as a replacement part and be detachably coupled to the pipetting device. In the latter case, the displacement device can be detached from the pipetting device after one or more dosing processes. Subsequently, another, in particular different, displacement device can be attached to the pipetting device.

The displacement device can be designed as a piston-cylinder unit or have a plurality of piston-cylinder units. Preferably, the displacement device has a displacement element, in particular a piston, and a displacement housing, in particular a cylinder. The displacement element is movably arranged in the displacement housing and is movable by means of a drive device in the displacement housing. The movement of the displacement element in the displacement housing is a substantially translatory movement, in particular in the axial direction of the displacement housing.

The pipetting device, together with the displacement device, can be based on the air cushion principle or on the positive displacement principle.

A pipette tip can be attachable to the displacement device, preferably in an airtight manner. The pipette tip can be connected to the displacement device by means of a plug connection. For this purpose, the displacement device can have a tubular cylindrical or conical end piece onto which the pipette tip is plugged with a corresponding tubular opening. The displacement device and the pipette tip can together form a closed air space. The displacement device changes the volume of the air space, allowing liquid to be aspirated/sucked into and dispensed from the pipette tip. The pipette tip is again separable and/or ejectable from the displacement device. For separating and/or ejecting the pipette tip from the displacement device, an ejector device and/or ejector mechanism is provided on the pipetting device.

Alternatively, the displacement device can be designed as a syringe.

The displacement device can be completely or partially separable from the pipetting device.

The pipetting device can be held by hand or be part of an automated laboratory system.

A pipetting device of the type in question is disclosed in European Patent Application Publication EP 3 399 215 A1 and corresponding U.S. Pat. No. 11,280,389 B2. The known pipetting device has a drive device with an electric motor and a gear device with a first output device, namely a threaded spindle. The gear device also has a spindle nut. The gear device is driven by the drive device and is adapted to transform a rotary motion of the electric motor into a translatory motion of the first output device. The output device drives a displacement element, namely a piston, of a displacement unit, namely an exchangeable syringe or a piston-cylinder unit of the pipetting device.

SUMMARY OF THE INVENTION

One object of the present invention is to improve the known pipetting device with regard to functionality and/or application possibilities and/or handling and/or the space requirement of the gear device.

According to the invention, the object described above is solved by the pipetting device that has a drive device with an electric motor, in particular with exactly one electric motor.

The pipetting device also has a gear device with a first output device. The gear device is driven, preferably exclusively, by the drive device, in particular by the electric motor, by means of a rotary motion. The gear device is designed to transmit a rotary motion of the electric motor to the first output device. Preferably, the gear device is designed to convert or transform a rotary motion of the electric motor into a preferably translatory motion of the first output device. A rotary motion of the electric motor need not necessarily result in a motion of the first output device. Thus, a movement/motion of the first output device can be temporarily and/or selectively blocked.

According to the invention, the gear device has a second output device and is designed to transmit a rotary motion of the electric motor to the second output device. Preferably, the gear device is designed to convert or transform a rotary motion of the electric motor into a preferably translatory motion of the second output device. A rotary motion of the electric motor need not necessarily result in a motion of the second output device. Thus, a movement/motion of the second output device can be temporarily and/or selectively blocked.

The pipetting device according to the invention thus has two output devices driven or drivable by the drive device, in particular the electric motor, which can drive different components, e.g., two different components of the pipetting device, and/or can transmit motions/movements and/or forces to different components.

By driving different components by a single electric motor, the space requirement is small or less than with the known pipetting device. In addition, this enables cost savings.

The two output devices can be moved in different directions by means of a single electric motor.

Due to the design/construction according to the invention, the pipetting device offers improved functionality and flexibility compared to the known pipetting device and opens up more possible applications.

Preferably, the first output device and the second output device are driven, preferably exclusively, by the electric motor of the drive device. In particular, not a plurality of electric motors, but exactly one electric motor is provided for driving the two output devices.

It is preferred if the first output device is couplable or coupled to a displacement device. As explained above, this displacement device can be an integral part of the pipetting device or be designed as a replacement part and be detachably coupled to the pipetting device. Preferably, the displacement device comprises a displacement element, in particular a piston, and a displacement housing, in particular a cylinder. The displacement element is movably arranged in the displacement housing. It is particularly preferred if the first output device is motionally coupled to the displacement element. When the first output device moves, in particular due to a rotary motion of the electric motor, the displacement element also moves. The motion/movement of the displacement element can then be used to pick up, dispense and meter/dose fluid volumes.

Advantageously, the pipetting device is designed so that the first output device and the second output device are movable translationally along the same straight line or parallel straight lines.

Preferably, the first output device is motionally couplable to the electric motor, in particular by means of further components of the gear device, so that in the coupled state a rotary motion of the electric motor is converted/transformed into a preferably translatory motion of the first output device. The second output device is motionally couplable to the electric motor, in particular by means of further components of the gear device, so that in the coupled state a rotary motion of the electric motor is converted/transformed into a preferably translatory motion of the second output device.

In a preferred embodiment, the gear device has a threaded nut that is motionally couplable to the electric motor, so that in the coupled state a rotary motion of the electric motor causes a rotary motion of the threaded nut. The first output device has a threaded spindle that is engaged with the threaded nut of the gear device and is secured against rotation, so that a rotary motion of the threaded nut caused by the electric motor causes a translatory motion of the threaded spindle.

Here, it is preferred that the threaded spindle is motionally couplable or coupled with a displacement element of a displacement device, preferably by means of a magnet of the pipetting device.

It is also preferred that the gear device has a rotationally movable threaded part that is motionally couplable with the electric motor, so that in the coupled state a rotary motion of the electric motor causes a rotary motion of the threaded part of the gear device. The second output device has a translationally movable threaded part that is engaged with the threaded part of the gear device, such that a rotary motion of the threaded part of the gear device caused by the electric motor causes a translatory motion of the threaded part of the second output device.

It is advantageous, in particular space-saving, if
the second output device, in particular the threaded part of the second output device, is arranged coaxially to the first output device, in particular to the threaded spindle of the first output device, and/or
the axis of motion of the second output device, in particular of the threaded part of the second output device, coincides with the axis of motion of the first output device, in particular of the threaded spindle of the first output device, and/or
the second output device, in particular the threaded part of the second output device, at least partially surrounds the first output device, in particular the threaded spindle of the first output device, and/or
the first output device, in particular the threaded spindle of the first output device, is arranged at least partially in a hollow space of the second output device, in particular in a hollow space of the threaded part of the second output device.

The term "axis of movement" or "axis of motion" is to be understood as the axis of symmetry of the first and/or second output device along which the first and/or second output device is movable.

In a preferred embodiment, the pipetting device has a switching device,
by means of which the gear device is switchable in such a way that the gear device moves either the first output device or the second output device when the gear device is driven by the electric motor, and/or
by means of which selectively the first output device or the second output device is blockable and/or
by means of which the gear device is movably couplable to the electric motor and movably decouplable from the electric motor.

Blocking of the first output device and/or the second output device can also occur indirectly by blocking a component of the pipetting device that is motionally coupled to the first output device and/or the second output device.

It is advantageous if the switching device is designed.
for activating a movement/motion of the first output device and for preferably simultaneously deactivating a movement/motion of the second output device and/or
for activating a movement/motion of the second output device and for preferably simultaneously deactivating a movement/motion of the first output device.

It is preferable if the switching device has a blocking device which is designed to block at least one component of the gear device and/or to block the first output device and/or to block the second output device. Preferably, the blocking device is axially adjustable relative to an axis of rotation of the gear device and/or is driven or movable by means of an activator of the pipetting device. The activator can be, for example, another electric motor or a magnet or a component of the pipetting device that can be operated manually from outside the pipetting device. By means of the activator, the blocking device can be movable into different positions, for example into a first blocking position for blocking the first output device and into a second blocking position for blocking the second output device. It can also be provided that the blocking device is movable by means of the activator into a basic position in which the blocking device blocks neither the first output device nor the second output device.

It is preferred if the switching device or the blocking device has a locking mechanism or the blocking device is formed by a locking mechanism. In particular, the locking mechanism is a form locking mechanism based on form closure or a force locking mechanism based on force closure, especially a friction locking mechanism or a magnetic locking mechanism.

By means of the blocking device it is possible to prevent that the two output devices are moved at the same time.

Preferably, the pipetting device has an operating element for controlling the electric motor, by means of which the blocking device and/or the activator is controllable. This allows easy handling. The operating element may, for example, have or be formed from a display, an operating button or the like. The operating element can also be designed to control further components or functions of the pipetting device.

It has proven advantageous if the gear device has an epicyclic gearing with
a first central wheel,
a second central wheel driven by the electric motor, which is arranged concentrically to the first central wheel and rotates about a central axis, and
an orbital wheel, preferably three orbital wheels, each orbital wheel being rotatable about an orbital axis and being disposed between the first and second central wheels and engaging/meshing the first and second central wheels, respectively.

Preferably, the first central wheel and/or a carrier of the orbital wheel rotates around the central axis.

Preferably, the epicyclic gearing is a planetary gearing, wherein
the first central wheel has a hollow space,
the second central wheel is arranged in the hollow space of the first central wheel, is driven by the electric motor and rotates about a central axis,
each orbital wheel is disposed between the first central wheel and the second central wheel in the hollow space and engages/meshes with the first central wheel and the second central wheel, respectively, and
the first central wheel and/or a carrier of the orbital wheel rotates about the central axis.

In such an arrangement of the epicyclic gearing as a planetary gearing, the first central wheel is also called a hollow wheel, the second central wheel is also called a sun wheel, the orbital wheel is also called a planetary wheel and the carrier of the orbital wheel is also called a planetary wheel carrier.

The design/construction with a planetary gearing allows a compact construction of the pipetting device and/or causes a small or smaller space requirement compared to the known pipetting device.

In a particularly preferred embodiment, the first central wheel is blockable, in particular by means of the blocking device, in such a way that no rotation of the first central wheel about the central axis is possible and a rotation of the second central wheel about the central axis causes a rotation of the carrier of the orbital wheel about the central axis. In this embodiment, moreover, the carrier of the orbital wheel is blockable, preferably by means of the blocking device, in such a way that no rotation of the orbital wheel or of the carrier of the orbital wheel about the central axis is possible and a rotation of the second central wheel about the central axis causes a rotation of the first central wheel about the central axis.

It is further preferred that the orbital wheel or the carrier of the orbital wheel is motionally coupled to the first output device. A movement of the orbital wheel or the carrier of the orbital wheel thus causes a movement/motion of the first output device.

In this context, it is preferred if the gear device has a threaded nut and the threaded nut is motionally couplable with the electric motor, so that in the coupled state a rotary motion of the electric motor causes a rotary motion of the threaded nut. The first output device comprises or is formed by a threaded spindle, the threaded spindle being engaged with the threaded nut of the gear device. The threaded spindle is secured against rotation. The orbital wheel or the carrier of the orbital wheel is motionally coupled to the threaded nut, so that a rotary motion of the orbital wheel or the carrier of the orbital wheel about the central axis causes a rotary motion of the threaded nut and a translatory motion of the threaded spindle.

Preferably, the threaded spindle is motionally couplable or coupled to the displacement element, preferably by means of a magnet of the pipetting device.

It is also preferred that the first central wheel is motionally coupled to the second output device. A movement/motion of the first central wheel thus causes a movement/motion of the second output device.

In this context, it is preferred if the gear device has a rotationally movable threaded part and the threaded part of the gear device is motionally couplable to the electric motor so that, in the coupled state, a rotary motion of the electric motor causes a rotary motion of the threaded part of the gear device. The second output device comprises a translationally movable threaded part which engages with a rotationally movable threaded part of the gear device, preferably with an external thread of the threaded part of the gear device. The first central wheel is motionally coupled to the threaded part of the gear device, such that a rotary motion of the first central wheel about the central axis causes a rotary motion of the threaded part of the gear device and a translatory motion of the threaded part of the second output device.

Preferably, the threaded spindle is arranged within a hollow space of the threaded part of the gear device and/or within a hollow space of the threaded part of the second output device. Preferably, the threaded part of the gear device is supported on/by the threaded nut. It may be provided that the threaded part of the second output device has a sleeve-shaped portion or is formed as a sleeve. It may also be provided that the threaded part of the gear device has a sleeve-shaped portion.

In a particularly preferred embodiment, the first central wheel is connected to a first coupling device of the pipetting device and the orbital wheel, preferably each orbital wheel, is connected to a second coupling device of the pipetting device. The pipetting device comprises a blocking device which is selectively couplable to the first coupling device or the second coupling device. When the blocking device is coupled to the first coupling device, rotation of the first central wheel about the central axis is blocked and thus the second output device is blocked. When the blocking device is coupled to the second coupling device, rotation of the orbital wheel, preferably each orbital wheel, about the central axis is blocked and thus the first output device is blocked.

In this embodiment, it is preferred if the blocking device is axially adjustable relative to an axis of rotation of the gear device and/or is driven or movable by means of an activator of the pipetting device. The activator can be designed as described above.

In a particularly preferred embodiment, the pipetting device, in particular the first output device, is coupled to a displacement device. Preferably, the displacement device has a displacement element, in particular a piston, and a displacement housing, in particular a cylinder. The displacement element is movably arranged in the displacement housing. In particular, the first output device is motionally coupled to the displacement element. Here, the pipetting device comprises an ejector device configured such that a pipette tip attached to the displacement device is movable relative to the displacement device and is finally ejectable from the displacement device and/or the pipetting device. The gear device is designed to transmit a rotary motion of the electric motor to the ejector device and, preferably, to convert or transform it into a preferably translatory motion of the ejector device, which leads to the ejection of a pipette tip from the pipetting device. Preferably, the ejector device is motionally coupled and/or movably driven with the second output device. Preferably, the gear device is designed to transmit a rotary motion of the electric motor to the second output device with a stepped-down or stepped-up ratio.

In this embodiment, it is possible to eject a pipette tip after aspirating/receiving a fluid volume without first dispensing the fluid volume from the pipette tip.

In this embodiment with an ejector device driven by means of the electric motor, the protection/relief of the user, in particular in the case of frequent pipetting, is very advantageous. This is all the more true in the case where the displacement device has a plurality of piston-cylinder units (multi-channel pipette), as in these cases considerable forces may be required to eject pipette tips attached to the displacement device.

In a further preferred embodiment, the pipetting device has a coupling apparatus for releasably coupling a displacement device, in particular a piston-cylinder arrangement, to the pipetting device. The gear device is designed to transmit a rotary motion of the electric motor to the coupling apparatus, which results in the release of a displacement device coupled to the pipetting device from the pipetting device. Preferably, the coupling device is motionally coupled to and/or movably driven by the second output device. Preferably, the gear device is designed to transmit a rotary motion of the electric motor to the second output device with a stepped-down or stepped-up ratio.

The invention is explained in more detail below based on the description of preferred embodiment examples, in part with references to the drawing. The features described above and/or disclosed in the claims and/or in the following description can be combined with each other as required, but can also be implemented independently of each other, even if this is not explicitly described individually.

DETAILED DESCRIPTION OF THE INVENTION

Figure 1:
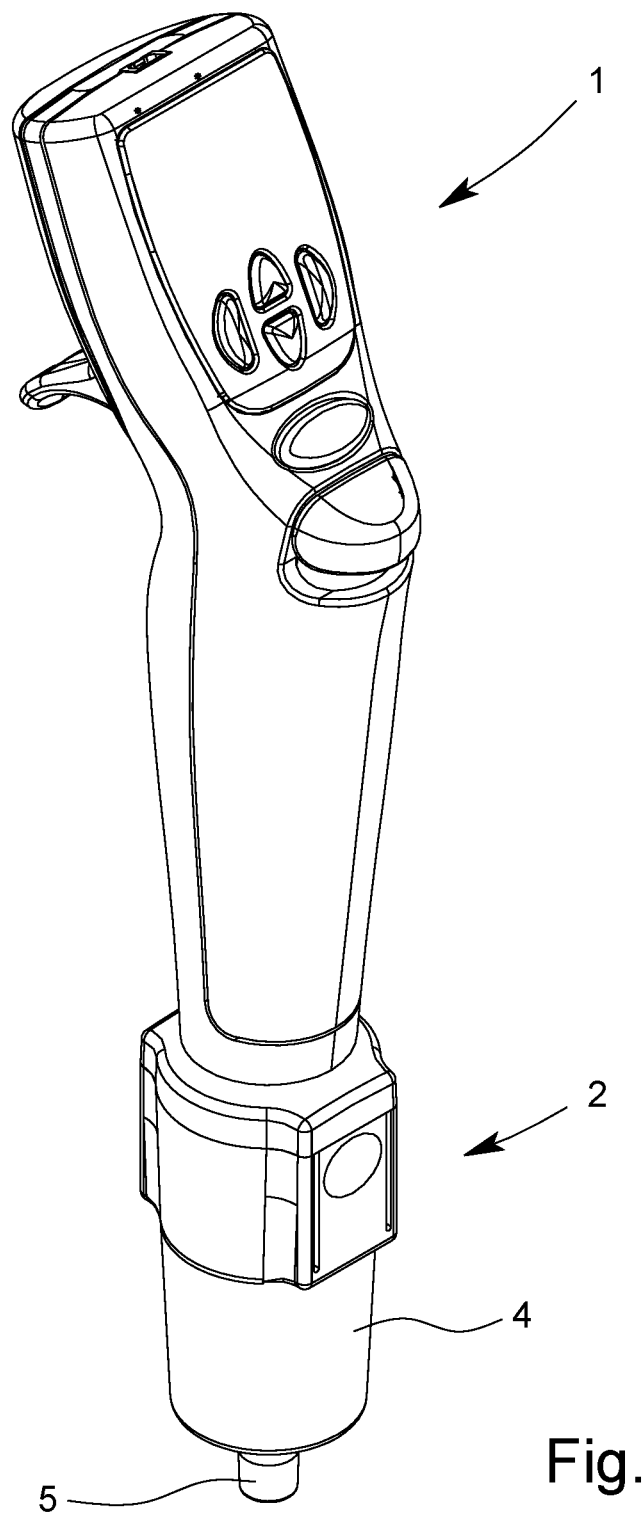
FIG. 1 schematically shows in a perspective view a first preferred embodiment of a pipetting device according to the invention, FIG. 2 schematically shows in a perspective view a part of a second preferred embodiment of a pipetting device according to the invention, wherein a simplified representation has been chosen with omission of parts of the pipetting device, FIG. 3 schematically shows a section through a part of the pipetting device of FIG. 2, wherein a simplified representation has been chosen with omission of parts of the pipetting device, FIG. 4 schematically shows in a perspective view a part of a third preferred embodiment of a pipetting device according to the invention, wherein a simplified representation has been chosen with omission of parts of the pipetting device, FIG. 5 schematically shows in a perspective view a part of a fourth preferred embodiment of a pipetting device according to the invention, wherein a simplified representation has been chosen with omission of parts of the pipetting device, FIG. 6 schematically shows in a perspective view a part of the pipetting device from FIG. 5, namely a part of a planetary gearing according to the invention, wherein a simplified representation has been chosen with omission of parts of the pipetting device, FIG. 7 schematically shows in a perspective view a part of the pipetting device from FIG. 5, namely a part of a gear device according to the invention, wherein a simplified representation has been chosen with omission of parts of the pipetting device, FIG. 8 schematically shows in a perspective view a part of the pipetting device from FIG. 5, namely a part of a gear device according to the invention, wherein a simplified representation has been chosen with omission of parts of the pipetting device, FIG. 9 schematically shows a section through a part of the pipetting device from FIG. 5, namely through a part of a gear device according to the invention, wherein a simplified representation has been chosen with omission of parts of the pipetting device, FIG. 10 schematically shows in a perspective view a part of the pipetting device from FIG. 5 in a first state, wherein a simplified representation has been chosen with omission of parts of the pipetting device, FIG. 11 schematically shows in a perspective view the part of the pipetting device from FIG. 10 in a second state, wherein a simplified representation has been chosen with omission of parts of the pipetting device, and FIG. 12 schematically shows in a perspective view a fifth preferred embodiment of a pipetting device according to the invention.

FIG. 1 shows schematically in a perspective view a preferred embodiment of a pipetting device 1 according to the invention for receiving and dispensing fluid volumes. This pipetting device 1 is a pipetting device 1 based on the air cushion principle. The pipetting device 1 has a displacement device 2, in particular a piston-cylinder arrangement, with a displacement element 3, in particular a piston, and a displacement housing 4, in particular a cylinder. The displacement element 3 is movably arranged within the displacement housing 4.

A pipette tip 7 (not shown in FIG. 1) is attachable to the displacement device 2. The pipette tip 7 is separable and/or ejectable from the displacement device 2. A pipette tip 7 can be connected to the displacement device 2 by means of a plug connection. For this purpose, the pipetting device 1 has a conically designed end piece 5 on the displacement device 2, onto which a pipette tip 7 with a corresponding opening can be plugged.

For separating and/or ejecting a pipette tip 7 from the displacement device 2, an ejector device 6 is provided on the pipetting device 1.

Figure 2:
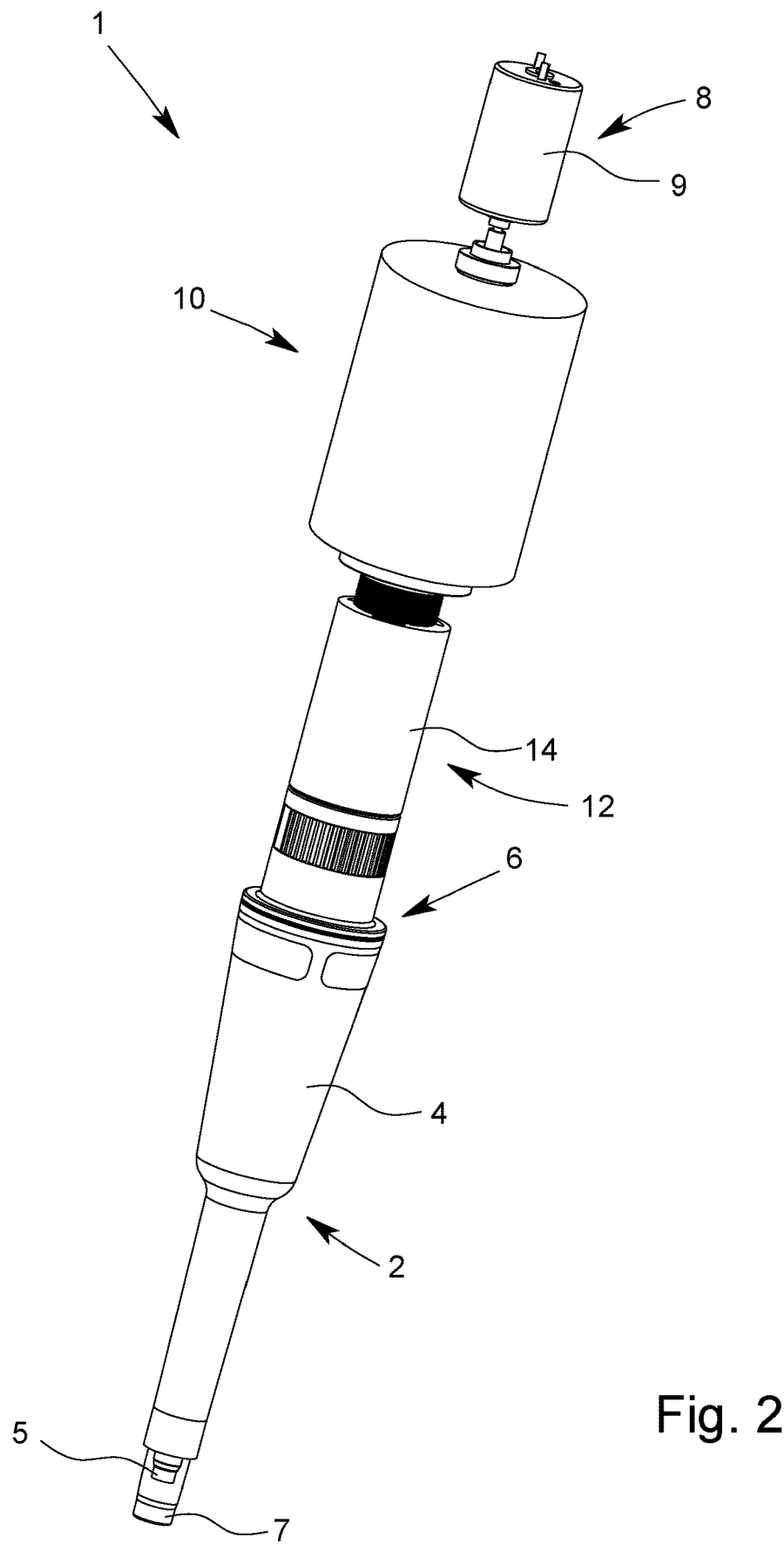

FIG. 2 shows schematically in a perspective view a part of a second preferred embodiment of a pipetting device 1 according to the invention, wherein a simplified representation has been chosen with omission of parts of the pipetting device 1. This pipetting device 1 is also a pipetting device 1 based on the air cushion principle. Compared to the pipetting device 1 of FIG. 1, the pipetting device 1 of FIG. 2 has a differently dimensioned displacement device 2. A pipette tip 7 is attached to the displacement device 2, in particular to its end piece 5.

In FIG. 2, it can be seen that in the illustrated and preferred embodiment example, the pipetting device 1 has a drive device 8 with an electric motor 9, in particular with exactly one electric motor 9. Furthermore, the pipetting device 1 has a gear device 10 with a first output device 11. The gear device 10 is driven by the electric motor 9 by means of a rotary motion and is designed to transmit a rotary motion of the electric motor 9 to the first output device 11. Here, the gear device 10 is designed to convert or transform a rotary motion of the electric motor 9 into a translatory motion of the first output device 11. In the preferred embodiment example shown in FIG. 2, the first output device 11 is motionally couplable to the electric motor 9, so that in the coupled state a rotary motion of the electric motor 9 is converted/transformed into a translatory motion of the first output device 11.

In the illustrated and preferred embodiment example, the gear device 10 has a second output device 12 and is designed to transmit a rotary motion of the electric motor 9 to the second output device 12. Here, the gear device 10 is designed to convert or transform a rotary motion of the electric motor 9 into a translatory motion of the second output device 12. In the preferred embodiment example shown in FIG. 2, the second output device 12 is motionally couplable to the electric motor 9, so that in the coupled state a rotary motion of the electric motor 9 is converted/transformed into a translatory motion of the second output device 12.

In the illustrated and preferred embodiment example, exactly one electric motor 9 (the electric motor 9 of the drive device 8) is provided for driving the first output device 11 and the second output device 12.

Figure 3:
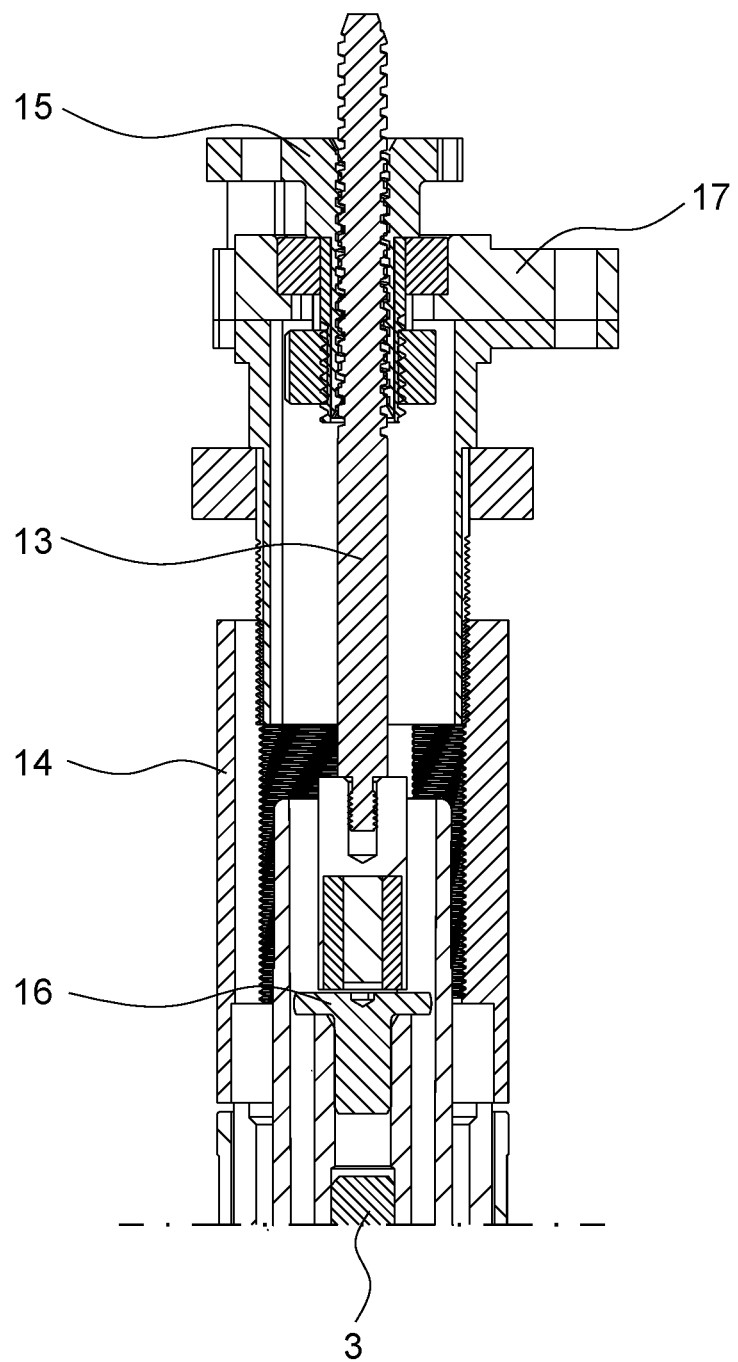

FIG. 3 schematically shows a section through a part of the pipetting device 1 of FIG. 2, wherein a simplified representation has been chosen with omission of parts of the pipetting device 1. In the illustrated and preferred embodiment example, the gear device 10 has a threaded nut 15 which is motionally couplable with the electric motor 9, so that in the coupled state a rotary motion of the electric motor 9 causes a rotary motion of the threaded nut 15. The first output device 11 has a threaded spindle 13 engaged with the threaded nut 15. The threaded spindle 13 is secured against rotation. Through the gear device 10, a rotary motion of the electric motor 9 causes a rotary motion of the threaded nut 15 and a translatory motion of the threaded spindle 13.

The threaded spindle 13 is motionally coupled to the displacement element 3, here by means of a magnet 16 of the pipetting device 1.

In the illustrated and preferred embodiment example, the gear device 10 has a rotationally movable threaded part 17 that is motionally couplable to the electric motor 9 so that in the coupled state a rotary motion of the electric motor 9 causes a rotary motion of the threaded part 17 of the gear device 10. The second output device 12 has a translationally movable threaded part 14 having a hollow cylindrical portion. The threaded part 14 of the second output device 12 engages with a rotationally movable threaded part 17 of the gear device 10, here with an external thread of the threaded part 17 of the gear device 10. Through the gear device 10, a rotary motion of the electric motor 9 causes a rotary motion of the threaded part 17 of the gear device 10 and a translatory motion of the threaded part 14 of the second output device 12.

The second output device 12, in particular the threaded part 14 of the second output device 12, is motionally coupled to the ejector device 6.

In the illustrated and preferred embodiment example, the ejector device 6 of the pipetting device 1 is designed in such a way that a pipette tip 7 attached to the displacement device 2 is movable relative to the displacement device 2 and finally ejectable from the displacement device 2 and the pipetting device 1.

The gear device 10 is designed to transmit a rotary motion of the electric motor 9 to the ejector device 6 and to convert/transform it into a translatory motion of the ejector device 6, which results in the ejection of a pipette tip 7 attached to the displacement device 2 from the displacement device 2.

Figure 4:
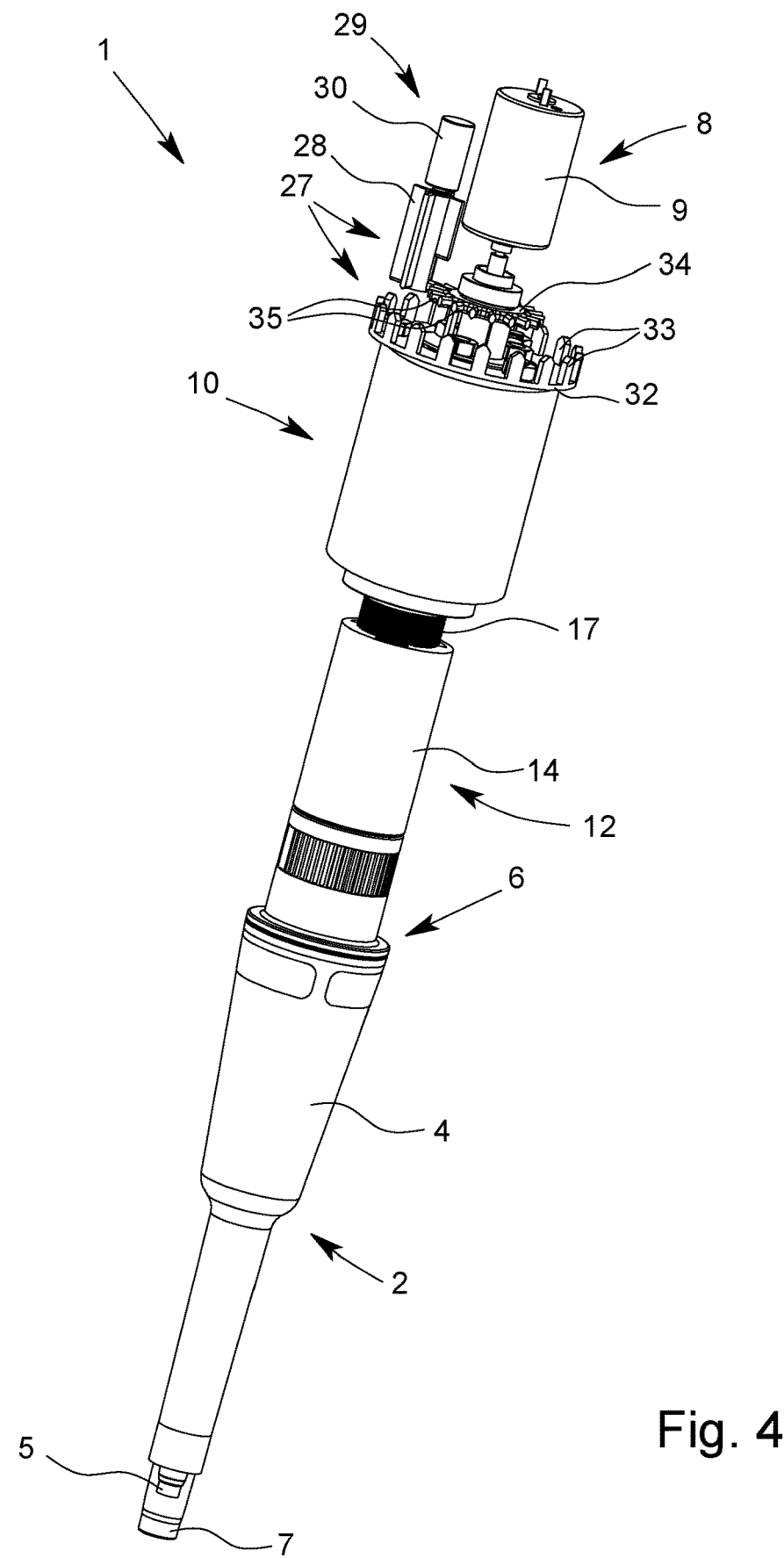

FIG. 4 shows schematically in a perspective view a part of a third preferred embodiment of a pipetting device 1 according to the invention, wherein a simplified representation has been chosen with omission of parts of the pipetting device 1. In comparison to the pipetting device 1 according to FIGS. 2 and 3, the pipetting device 1 according to FIG. 4 additionally has a switching device 27. This switching device 27 is explained in more detail with reference to FIGS. 10 and 11.

In all illustrated and preferred embodiment examples, the second output device 12, namely the threaded part 14 of the second output device 12, is arranged coaxially to the first output device 11, namely to the threaded spindle 13 of the first output device 11. The axis of motion of the threaded part 14 of the second output device 12 coincides with the axis of motion of the threaded spindle 13. This axis of motion corresponds to the central longitudinal axis of the pipetting device 1. The threaded part 14 of the second output device 12 has a hollow cylindrical portion which surrounds at least part of the threaded spindle 13. At least a part of the threaded spindle 13 is arranged in a hollow space delimited by the hollow cylindrical portion of the threaded part 14 of the second output device 12.

Figure 5:
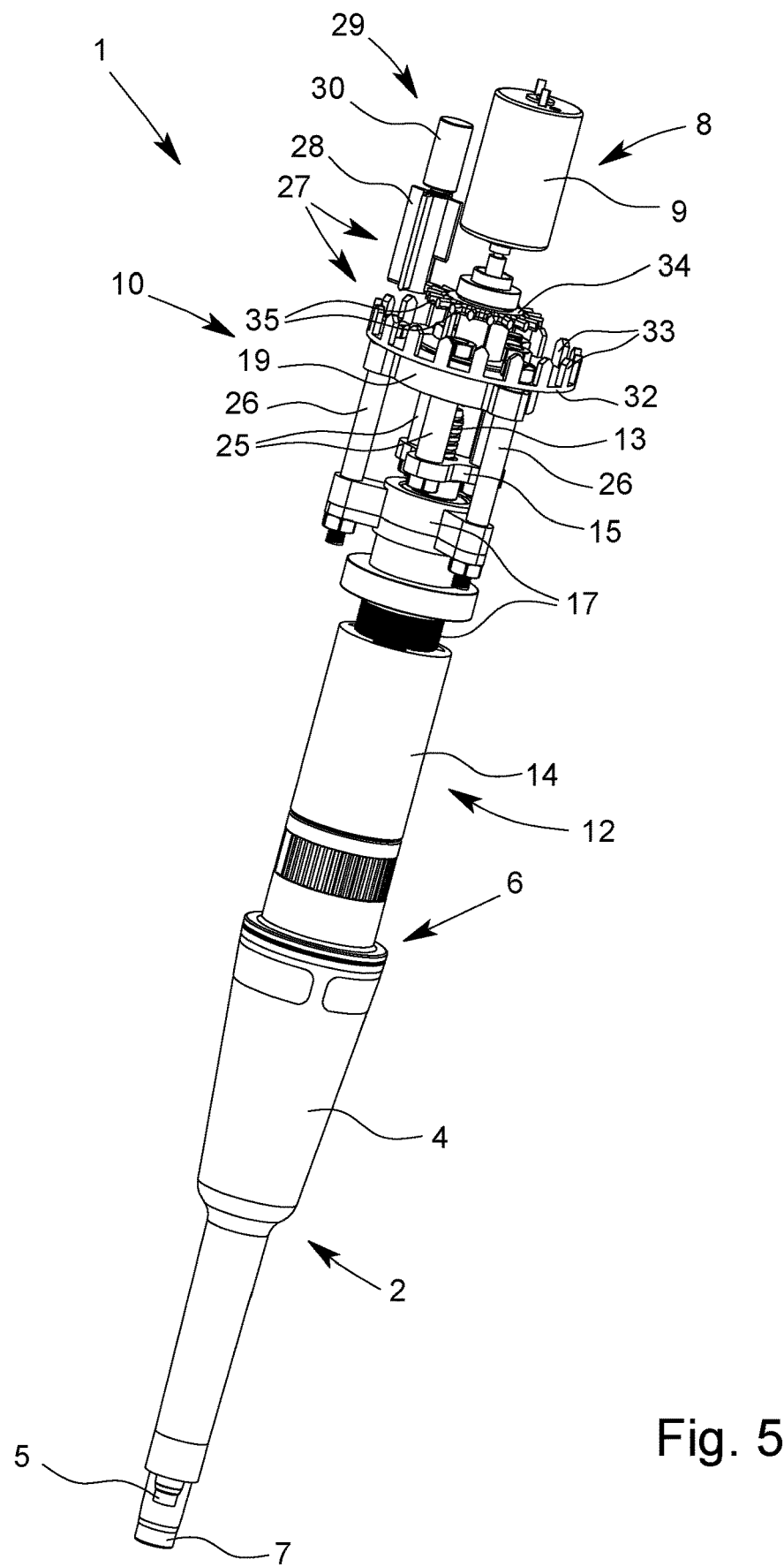

FIG. 5 shows schematically in a perspective view a part of a third preferred embodiment of a pipetting device 1 according to the invention, wherein a simplified representation has been chosen with omission of parts of the pipetting device 1. In comparison with the embodiment examples according to FIGS. 2 to 4, the gear device 10 of the pipetting device 1 according to FIG. 5 has an epicyclic gearing 18 with
  a first central wheel 19, which has a hollow space 20,
  a second central wheel 21, which is arranged centrally in the hollow space 20 of the first central wheel 19, is driven by the electric motor 9 and thereby rotates about a central axis 22, and
  three orbital wheels 23, each orbital wheel 23 being rotatable about an orbital axis 24 and being arranged between the first central wheel 19 and the second central wheel 21 in the hollow space 20 and being engaged with the first central wheel 19 and the second central wheel 21, respectively.

The first central wheel 19 and/or a carrier 25 of the respective orbital wheel 23 rotates/rotate about the central axis 22.

Such an epicyclic gearing 18 is also referred to as a planetary gearing 18, wherein the first central wheel 19 is also referred to as a hollow wheel 19, the second central wheel 21 is also referred to as a sun wheel 21, the orbital wheels 23 are also referred to as planetary wheels 23, and the carriers 25 of the planetary wheels are also referred to as planetary wheel carriers 25.

An advantage of this design is the compact and predominantly axially aligned construction.

Figure 6:
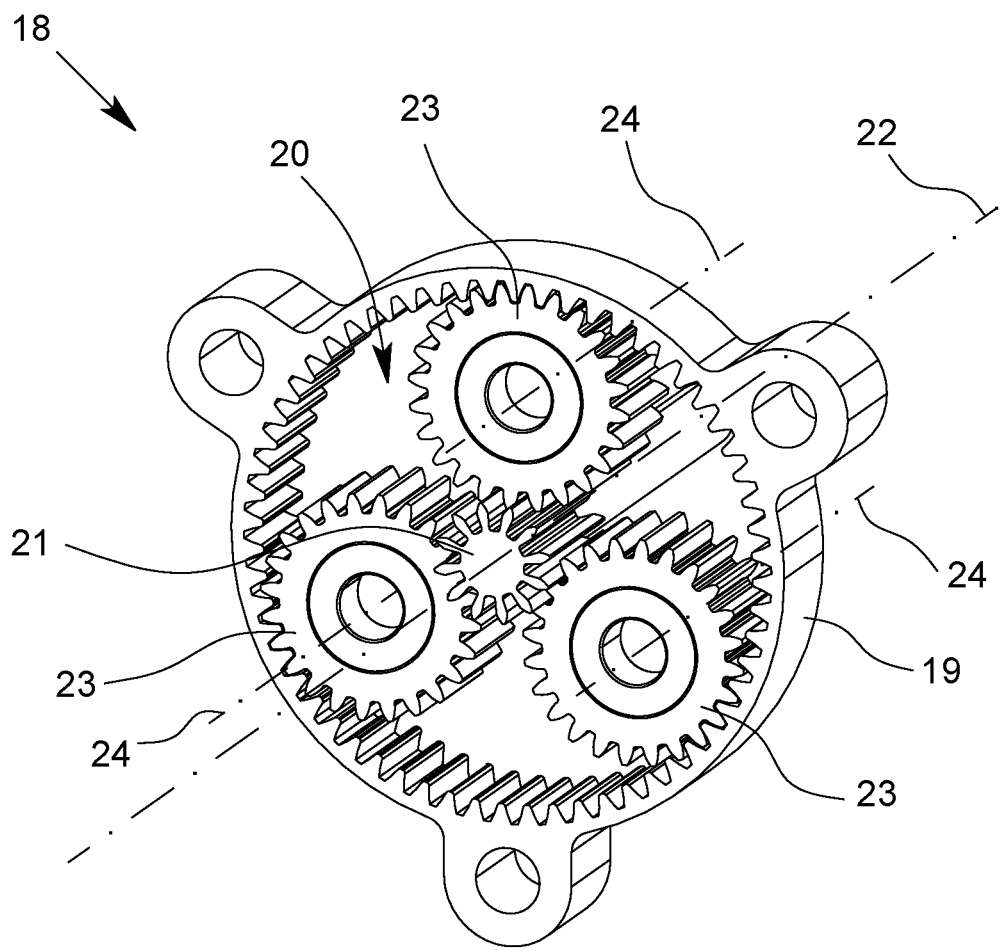

A part of the epicyclic gearing 18 of the pipetting device 1 from FIG. 5 is shown schematically in FIG. 6 in a perspective view, wherein a simplified representation has been chosen with omission of parts of the pipetting device 1.

In the illustrated and preferred embodiment example, the first central wheel 19 has toothing on an inner side. This toothing of the first central wheel 19 can have, for example, between 30 and 90 teeth—here, this toothing of the first central wheel 19 has, by way of example, 60 teeth. Each orbital wheel 23 has a toothing on an outer side. The toothing of each orbital wheel 23 may have, for example, between 12 and 48 teeth—here this toothing of each orbital wheel 23 has, by way of example, 24 teeth. The second central wheel 21 has a toothing on an outer side. This toothing of the second central wheel 21 may have, for example, between 6 and 24 teeth—here, this toothing of the second central wheel 21 has, by way of example, 12 teeth. The toothing of each orbital wheel 23 engages/meshes with both the toothing of the first central wheel 19 and the toothing of the second central wheel 21. The gear module is preferably between 0.2 mm and 0.8 mm, in particular 0.4 mm.

Figure 7:
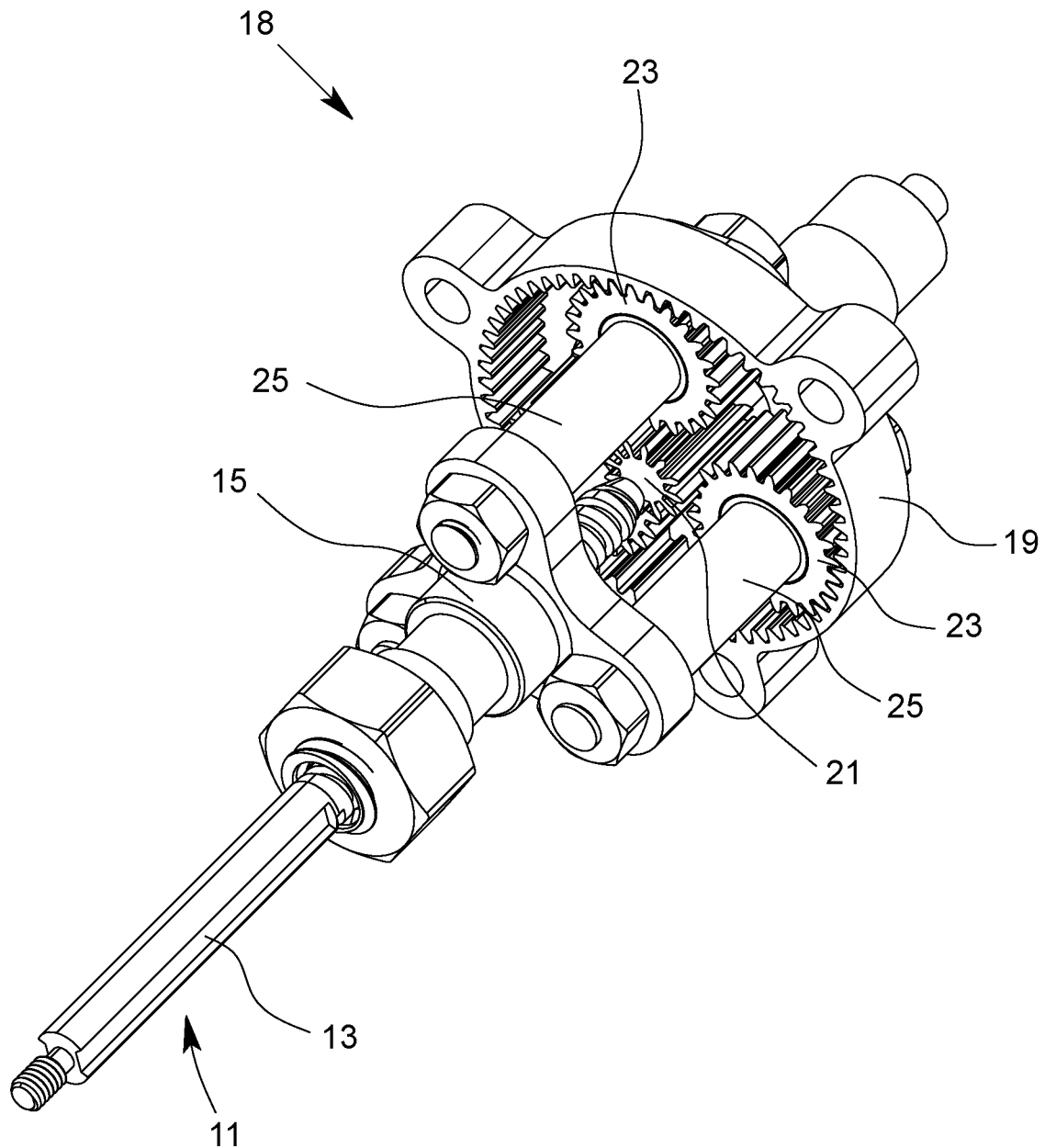
Figure 8:
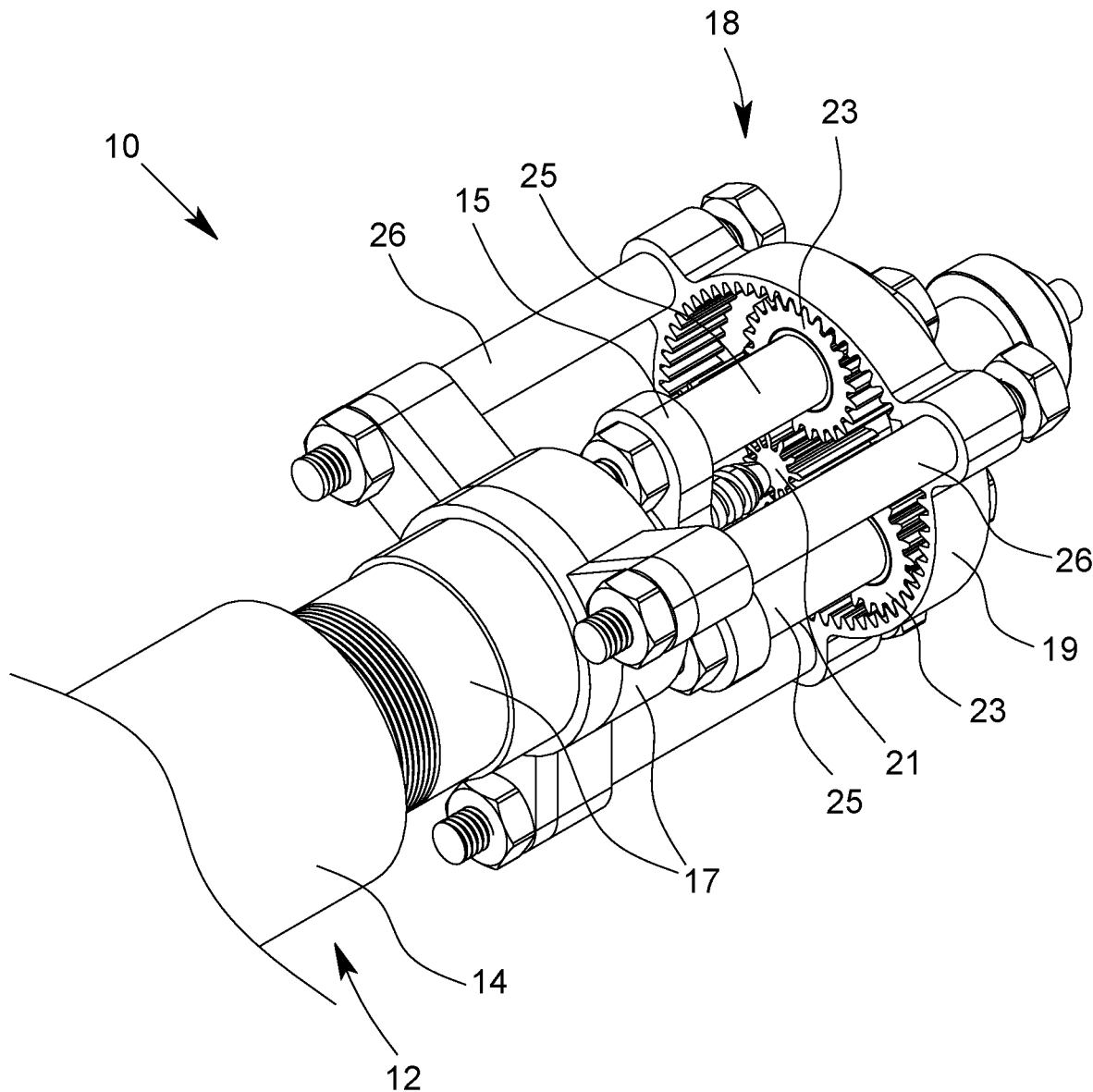

The part of the epicyclic gearing 18 from FIG. 6 and further parts of the gear device 10 of the pipetting device 1 from FIG. 5 are shown schematically in a perspective view in FIGS. 7 and 8, respectively, wherein a simplified representation has been chosen with omission of parts of the pipetting device 1.

Figure 9:
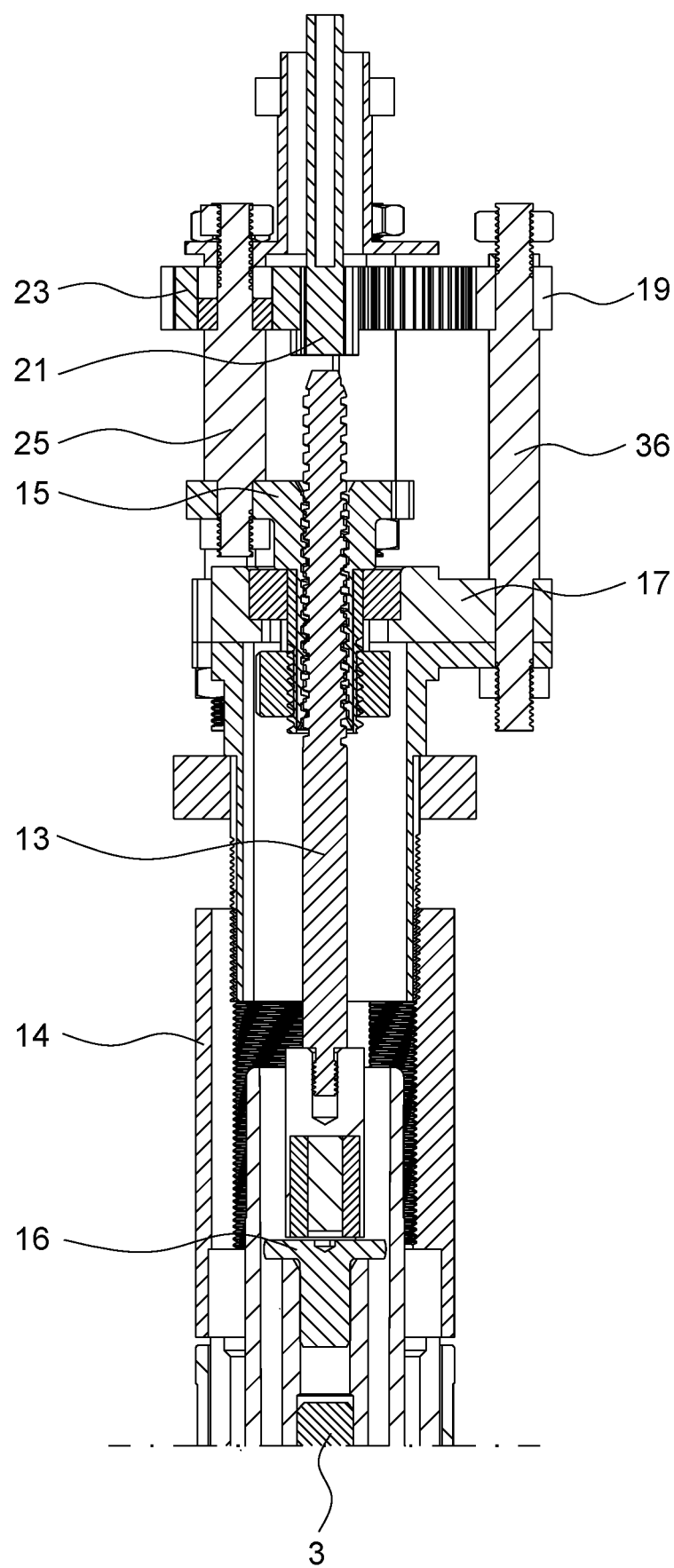

Details of the pipetting device 1 from FIG. 5, in particular the of gear device 10, are shown in the sectional view of FIG. 9.

In the preferred embodiment example shown here, each orbital wheel carrier is motionally coupled to an orbital wheel 23 and to the threaded nut 15. Each orbital wheel 23 is motionally coupled to the first output device 11, in particular to the threaded spindle 13, by means of the respective orbital wheel carrier 25. A rotary motion of the orbital wheels 23 about the central axis 22 causes a rotary motion of the orbital wheel carriers 25 about the central axis 22, which causes a rotary motion of the threaded nut 15 of the gear device 10, which—due to the anti-rotation lock of the threaded spindle 13—causes a translational motion of the threaded spindle 13.

In the illustrated and preferred embodiment example, the first central wheel 19 is motionally coupled to the second output device 12. In particular, a connecting element 26 is attached to the first central wheel 19, here there are three connecting elements 26. Each connecting element 26 is connected and/or motionally coupled to the threaded part 17 of the gear device 10. A rotary motion of the first central wheel 19 about the central axis 22 causes a rotary motion of the threaded part 17 of the gear device 10 and a translational motion of the threaded part 14 of the second output device 12.

In the illustrated and preferred embodiment example, the gear device 10 is designed to transmit a rotary motion of the electric motor 9 in a geared manner to the second output device 12, here with a gear ratio of −5. In addition, the gear device 10 is designed to transmit a rotary motion of the electric motor 9 in a geared manner to the first output device 11, here with a gear ratio of 6. Both with regard to the first output device 11 and with regard to the second output device 12, it is possible to select other gear ratios or no gearing-up/gearing-down.

In the illustrated and preferred embodiment example, the electric motor 9 has a holding torque of between 3 mNm and 12 mNm, in particular of 8 mNm.

In the illustrated and preferred embodiment example, the ejector device 6 can exert a force of between 20 N and 180 N, further preferably of 80 N to 120 N, in particular of 100 N on a pipette tip 7 attached to the displacement device 2.

Figure 10:
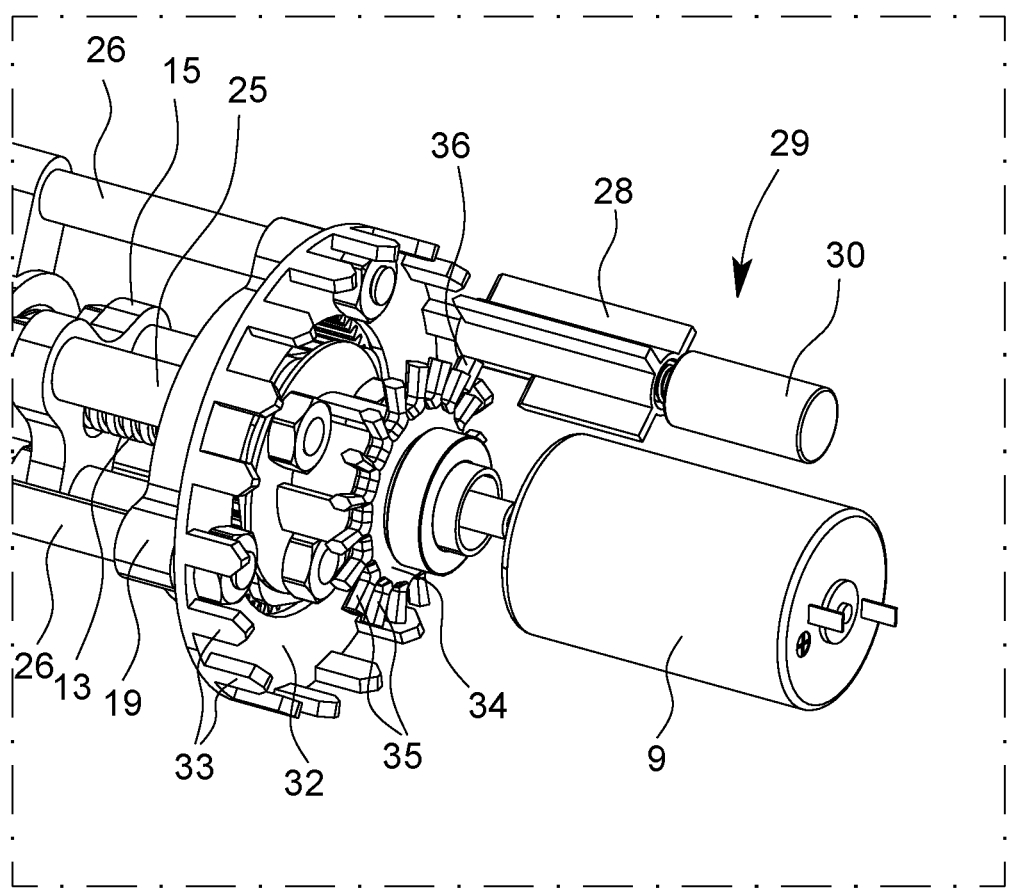

FIG. 10 shows schematically in a perspective view a part of the pipetting device 1 from FIG. 5 in a first state, wherein a simplified representation has been chosen with omission of parts of the pipetting device 1.

In the illustrated and preferred embodiment example, the pipetting device 1 has a switching device 27. By means of the switching device 27, the gear device 10 is switchable in such a way that the gear device 10 moves either the first output device 11 or the second output device 12 when the gear device 10 is driven by the electric motor 9. By means of the switching device 27, selectively the first output device 11 or the second output device 12 is blockable.

It is preferred that—as shown—the switching device 27 has a blocking device 28 for blocking at least one component of the gear device 10. The blocking device 28 is designed in particular for blocking the first output device 11 and/or the second output device 12.

In the illustrated and preferred embodiment example, the blocking device 28 is driven by an activator 29 of the switching device 27, which activator 29 here has a further electric motor 30. The blocking device 28 is arranged on a shaft 31 of the electric motor 30. By means of the electric motor 30 and a threaded arrangement, the blocking device 28 is axially adjustable relative to an axis of rotation of the gear device 10 and axially adjustable relative to an axis extending through the shaft 31 of the electric motor 30.

In the illustrated and preferred embodiment example, the pipetting device 1 has a first coupling device 32 with projections 33 and a second coupling device 34 with projections 35. The first central wheel 19 is connected to the first coupling device 32 in a rotationally fixed manner and the orbital wheels 23 are connected to the second coupling device 34 in a rotationally fixed manner. The blocking device 28 is selectively couplable to the first coupling device 32 or the second coupling device 34.

In the first state shown in FIG. 10, the blocking device 28 is coupled to the second coupling device 34, namely a projection 36 of the blocking device 28 is arranged between two projections 35 of the second coupling device 34. In this first state, the blocking device 28 is not coupled to the first coupling device 32.

Figure 11:
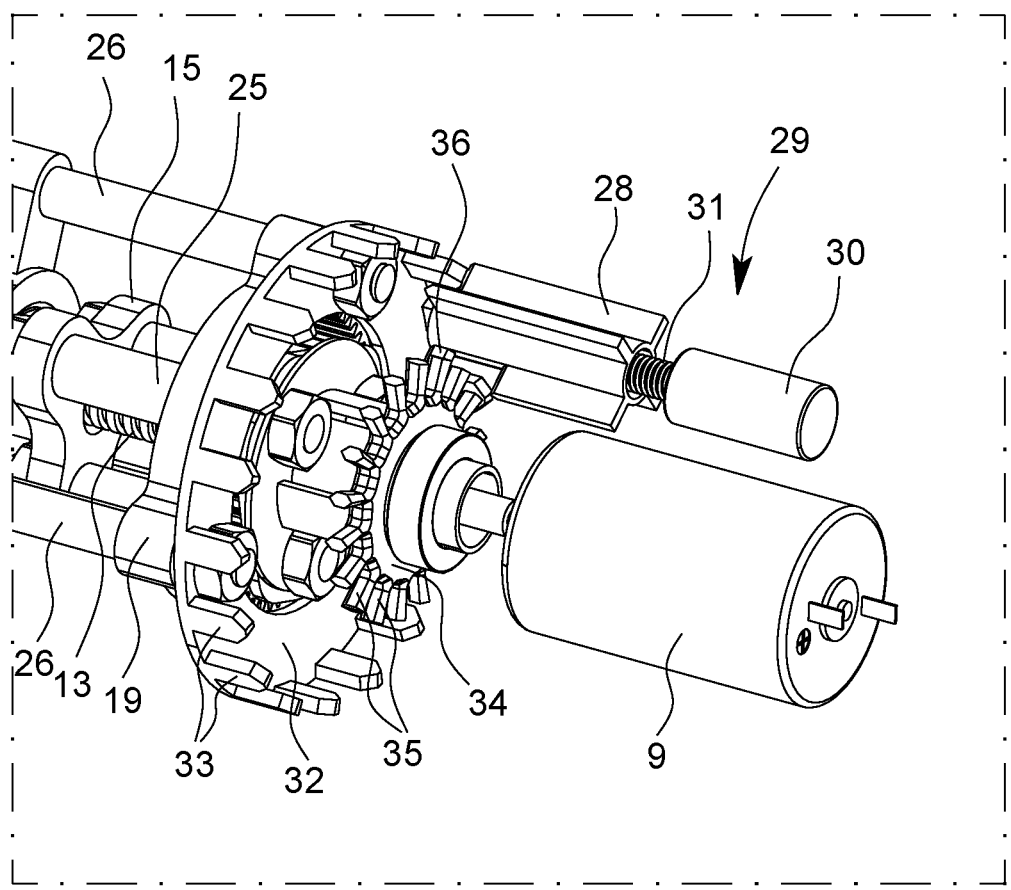

In the second state shown in FIG. 11, the blocking device 28 is axially displaced in the direction of the first coupling device 32 and coupled to the first coupling device 32, namely a (different) projection 36 of the blocking device 28 is arranged between two projections 33 of the first coupling device 32. In this second state, the blocking device 28 is not coupled to the second coupling device 34.

In particular, thus, a projection 36 of the blocking device 28 can be engaged with one projection 33 or with a plurality of projections 33 of the first coupling device 32 and/or a projection 36 of the blocking device 28 can be engaged with one projection 35 or with a plurality of projections 35 of the second coupling device 34, but this not simultaneously but exclusively successively or alternately.

When the blocking device 28 is coupled to the first coupling device 32, rotation of the first central wheel 19 about the central axis 22 is blocked. Thus, the second output device 12, i.e., a movement/motion of the second output device 12, is also blocked. Rotation of the first central wheel 19 about the central axis 22 is not possible, and rotation of the second central wheel 21 about the central axis 22—caused by the electric motor 9—causes rotation of the orbital wheel carriers 25 about the central axis 22, which causes rotation of the threaded nut 15. This results in a translatory movement/motion of the threaded spindle 13.

When the blocking device 28 is coupled to the second coupling device 34, rotation of the orbital wheels 23 about the central axis 22 is blocked. Thus, the first output device 11, i.e. a movement/motion of the first output device 11, is blocked. Rotation of the orbital wheels 23 and the orbital wheel carriers 25 about the central axis 22 is not possible. Rotation of the second central wheel 21 about the central axis 22—caused by the electric motor 9—causes rotation of the first central wheel 19 about the central axis 22, which causes rotation of the threaded part 17 of the gear device 10. This results in a translatory movement/motion of the second output device 12.

It is not shown that the pipetting device 1 has an operating element for controlling the electric motor 9. It is provided here that the blocking device 28 and/or the activator 29 are/is also controllable by means of this operating element. This permits simple and convenient handling.

Figure 12:
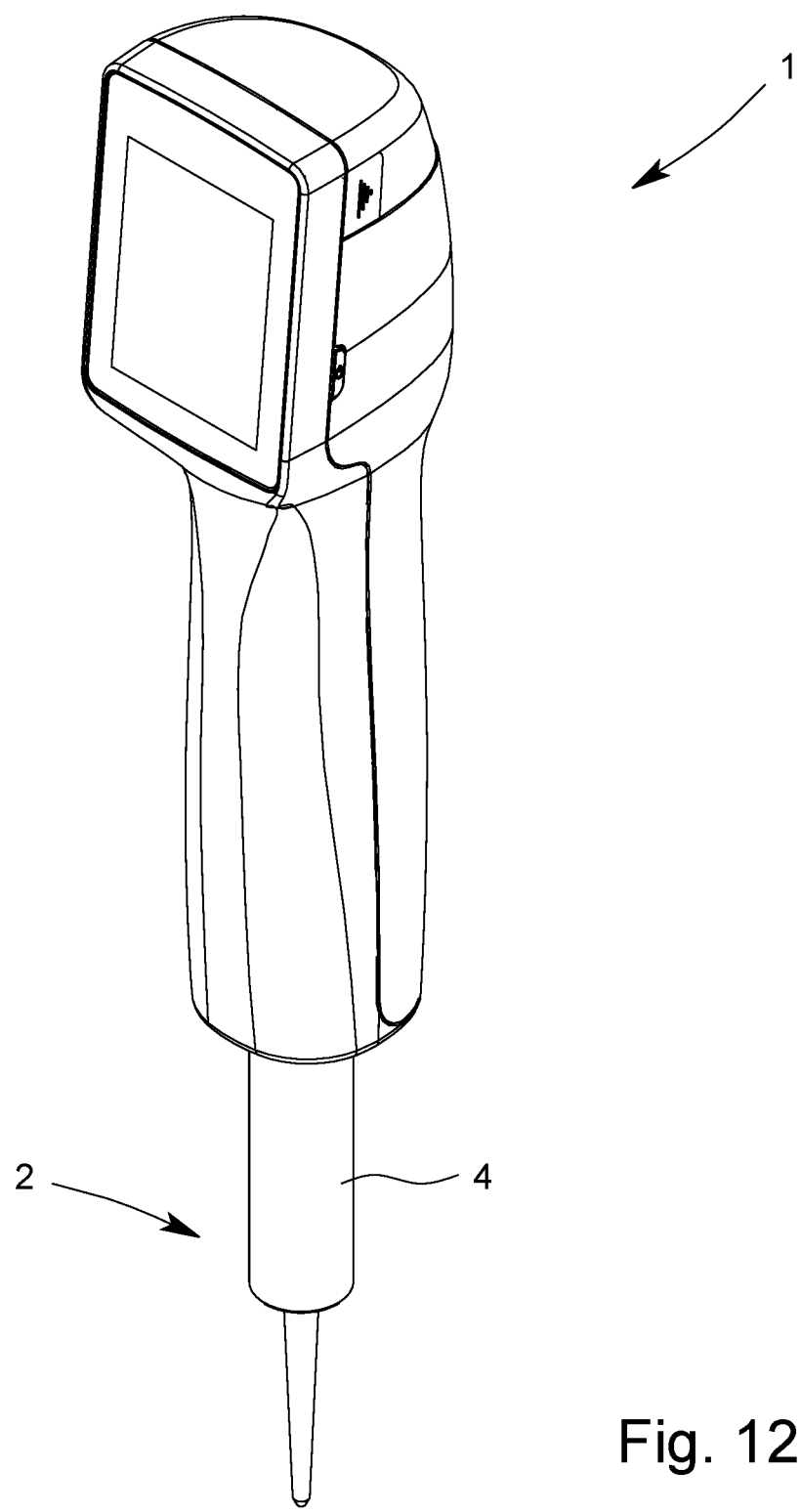

FIG. 12 shows schematically in a perspective view a further embodiment of a pipetting device 1 according to the invention. Here, it is a dispenser for receiving and dispensing fluid volumes, based on the positive displacement principle.

The dispenser has a drive device 8 as previously described and a gear device as previously described and a switching device 27 as previously described.

The dispenser also has a coupling apparatus (not shown) for releasably coupling a displacement device 2 to the dispenser. In this case, the displacement device 2 is designed as an exchangeable piston-cylinder arrangement. The gear device 10 of the dispenser is designed to transmit a rotary motion of the electric motor 9 to the coupling apparatus, which results in the release of a displacement device 2 coupled to the dispenser from the dispenser. For this purpose, the coupling apparatus is motionally coupled to and/or movably driven by the second output device 12 of the gear device 10 of the dispenser. Preferably, the gear device 10 is designed to transmit a rotary motion of the electric motor 9 to the second output device 12 in a stepped-down or stepped-up manner.

| List of references: | |
| --- | --- |
| 1 | Pipetting device |
| 2 | Displacement device |
| 3 | Displacement element of 2 |
| 4 | Displacement housing of 2 |
| 5 | End piece of 2 |
| 6 | Ejector device of 1 |
| 7 | Pipette tip of 2 |
| 8 | Drive device of 1 |
| 9 | Electric motor of 8 |
| 10 | Gear device of 1 |
| 11 | First output device of 10 |
| 12 | Second output device of 10 |
| 13 | Threaded spindle of 11 |
| 14 | Threaded part of 12 |
| 15 | Threaded nut of 10 |
| 16 | Magnet of 1 |
| 17 | Threaded part of 10 |
| 18 | Epicyclic gearing of 10 |
| 19 | First central wheel of 18 |
| 20 | Hollow space of 19 |
| 21 | Second central wheel of 18 |
| 22 | Central axis of 18 |
| 23 | Orbital wheels of 18 |
| 24 | Orbital axis of 23 |
| 25 | Orbital wheel carrier for 23 |
| 26 | Connecting element of 10 |
| 27 | Switching device of 1 |
| 28 | Blocking device of 27 |
| 29 | Activator of 27 |
| 30 | Electric motor of 29 |
| 31 | Shaft of 30 |
| 32 | First coupling device of 1 |
| 33 | Projections of 32 |
| 34 | Second coupling device of 1 |
| 35 | Projections of 34 |
| 36 | Projections of 28 |

The invention claimed is:

1. A pipetting device for receiving and dispensing fluid volumes, comprising
a drive device with an electric motor, and
a gear device,
wherein the gear device is coupled to the electric motor in a manner enabling the gear device to be driven in a rotary motion,
wherein the gear device has a first output device and a second output device, and
wherein the gear device is configured to transmit rotary motion of the electric motor to translate the first output device or to translate the second output device, and
a switching device by means of which the gear device can be switched in such a way that the gear device moves either the first output device or the second output device when the gear device is driven by the electric motor.

2. The pipetting device according to claim 1, wherein the first output device is couplable or coupled to a displacement device,
wherein the displacement device comprises a piston and a cylinder, the piston being movably arranged in the cylinder, and
wherein the first output device is coupled to move the piston.

3. The pipetting device according to claim 1, wherein the first output device is couplable to the electric motor such that rotary motion of the electric motor is transformed into translatory motion of the first output device, and
wherein the second output device is couplable to the electric motor such that rotary motion of the electric motor is transformed into translatory motion of the second output device.

4. The pipetting device according to claim 1, wherein
the gear device comprises a threaded nut which can be motionally coupled with the electric motor, so that rotary motion of the electric motor causes a rotary motion of the threaded nut, and
the first output device comprises a threaded spindle which is engaged with the threaded nut and is secured against rotation, so that rotary motion of the threaded nut caused by the electric motor causes translatory motion of the threaded spindle.

5. The pipetting device according to claim 1, wherein
the gear device has a rotationally movable threaded part and the threaded part of the gear device can be motionally coupled to the electric motor, so that rotary motion of the electric motor causes rotary motion of the threaded part of the gear device, and
the second output device has a translationally movable threaded part which is engaged with the threaded part of the gear device, so that rotary motion of the threaded part of the gear device caused by the electric motor causes translatory motion of the threaded part of the second output device.

6. The pipetting device according to claim 5, wherein
the second output device is arranged coaxially relative to the first output device, and/or
an axis of movement of second output device coincides with an axis of movement of the first output device, and/or
the second output device at least partially surrounds the first output device, and/or
the first output device is arranged at least partially in a hollow space of the second output device.

7. The pipetting device according to claim 1, wherein the pipetting device has the switching device
by means of which either the first output device or the second output device can be blocked against movement, and/or
by means of which the gear device can be motionally coupled to the electric motor and motionally decoupled from the electric motor.

8. The pipetting device according to claim 7, wherein the switching device has means for:
activating a movement of the first output device and for simultaneously deactivating a movement of the second output device, and/or
activating a movement of the second output device and for simultaneously deactivating a movement of the first output device.

9. The pipetting device according to claim 7, wherein the switching device has a blocking device which is able to block at least one component of the gear device and/or block the first output device and/or block the second output device, wherein the blocking device
has a locking mechanism, and/or
is axially adjustable relative to an axis of rotation of the gear device, and/or
is driven or movable by means of an activator of the pipetting device.

10. The pipetting device according to claim 9, wherein the pipetting device has an operating element for controlling the electric motor, by means of which the blocking device is controllable.

11. The pipetting device according to claim 1, wherein the gear device comprises an epicyclic gearing having
a first central wheel,
a second central wheel driven by the electric motor, which is arranged concentrically to the first central wheel and thereby rotates about a central axis, and
at least one orbital wheel, each orbital wheel being rotatable about an orbital axis and being arranged between the first central wheel and second central wheel and respectively engaging the first central wheel and second central wheel,
wherein the first central wheel and/or a carrier of the orbital wheel rotates about the central axis.

12. The pipetting device according to claim 11, wherein the epicyclic gearing is a planetary gearing, wherein
the first central wheel has a hollow space,
the second central wheel is arranged in the hollow space of the first central wheel, is driven by the electric motor and rotates about a central axis,
each orbital wheel is arranged between the first central wheel and second central wheel in the hollow space and is engaged with the first central wheel and the second central wheel, respectively, and
the first central wheel and/or a carrier of each orbital wheel rotates about the central axis.

13. The pipetting device according to claim 11, wherein the first central wheel can be blocked in such a way that no rotation of the first central wheel about the central axis is possible and a rotation of the second central wheel about the central axis causes a rotation of the carrier of the orbital wheel about the central axis, and
the carrier of the orbital wheel can be blocked in such a way that no rotation of the orbital wheel or of the carrier of the orbital wheel about the central axis is possible and a rotation of the second central wheel about the central axis causes a rotation of the first central wheel about the central axis.

14. The pipetting device according to claim 11, wherein the orbital wheel or the carrier of the orbital wheel is motionally coupled to the first output device, wherein
the gear device has a threaded nut and the threaded nut can be motionally coupled to the electric motor, so that in the coupled state a rotary motion of the electric motor causes a rotary motion of the threaded nut,
the first output device comprises a threaded spindle which is engaged with the threaded nut and is secured against rotation, and
the orbital wheel or the carrier of the orbital wheel is motionally coupled with the threaded nut, so that rotary motion of the orbital wheel or the carrier of the orbital wheel about the central axis causes rotary motion of the threaded nut and translatory motion of the threaded spindle.

15. The pipetting device according to claims 11, wherein the first central wheel is motionally coupled to the second output device, wherein
the gear device comprises a rotationally movable threaded part and the threaded part of the gear device can be motionally coupled to the electric motor, so that rotary motion of the electric motor causes rotary motion of the threaded part of the gear device,
the second output device has a translationally movable threaded part which is engaged with a rotationally movable threaded part of the gear device, and
the first central wheel is motionally coupled to the threaded part of the gear device, so that rotary motion of the first central wheel about the central axis causes rotary motion of the threaded part of the gear device and translatory motion of the threaded part of the second output device.

16. The pipetting device according to claim 11, wherein
the first central wheel is connected to a first coupling device of the pipetting device and the orbital wheel is connected to a second coupling device of the pipetting device,
the pipetting device has a blocking device which can be selectively coupled to the first coupling device or to the second coupling device,
when the blocking device is coupled to the first coupling device, rotation of the first central wheel about the central axis is blocked and thus the second output device is blocked, and
when the blocking device is coupled to the second coupling device, a rotation of the orbital wheel about the central axis is blocked and thus the first output device is blocked.

17. The pipetting device according to claim 1, wherein
the first output device is coupled to a displacement device that comprises a piston and a cylinder, the piston being movably arranged in the cylinder,
an ejector device is provided for ejecting a pipette tip attached to the displacement device, which can be ejected from the displacement device and/or the pipetting device, and
the gear device transmits a rotary motion of the electric motor to the ejector device for ejection of the pipette tip from the pipetting device, and
the ejector device is motionally coupled to the second output device.

18. The pipetting device according to claim 1, wherein
the pipetting device has a coupling apparatus for releasably coupling a piston-cylinder arrangement to the pipetting device,
the gear device is operable to transmit rotary motion of the electric motor to the coupling apparatus for releasing the piston-cylinder arrangement from the pipetting device, and
the coupling apparatus is motionally coupled to the second output device.

* * * * *